(12) United States Patent
Cheng et al.

(10) Patent No.: US 9,343,962 B2
(45) Date of Patent: May 17, 2016

(54) POWER REGULATOR SYSTEM WITH ADAPTIVE RAMP SIGNAL GENERATOR

(71) Applicant: TEXAS INSTRUMENTS INCORPORATED, Dallas, TX (US)

(72) Inventors: Kuang-Yao Cheng, East Greenwich, RI (US); Hal Chen, Hoboken, NJ (US); Wenkai Wu, East Greenwich, RI (US); Weidong Zhu, East Lyme, CT (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 117 days.

(21) Appl. No.: 13/906,967

(22) Filed: May 31, 2013

(65) Prior Publication Data

US 2014/0266112 A1 Sep. 18, 2014

Related U.S. Application Data

(60) Provisional application No. 61/783,766, filed on Mar. 14, 2013.

(51) Int. Cl.
*H02M 3/158* (2006.01)
*H02M 1/00* (2007.01)
*H02M 3/156* (2006.01)

(52) U.S. Cl.
CPC .............. *H02M 3/156* (2013.01); *H02M 3/158* (2013.01); *H02M 3/1588* (2013.01); *H02M 2001/0025* (2013.01); *H02M 2001/0032* (2013.01)

(58) Field of Classification Search
CPC ............................................. H02M 2001/0025

USPC ......... 323/222, 242, 271, 282, 283, 284, 285, 323/288
See application file for complete search history.

(56) References Cited

U.S. PATENT DOCUMENTS

| | | | | |
|---|---|---|---|---|
| 3,189,833 | A * | 6/1965 | Rodgers | 327/174 |
| 7,042,203 | B2 * | 5/2006 | Van Der Horn et al. | 323/285 |
| 7,453,246 | B2 * | 11/2008 | Qiu et al. | 323/282 |
| 7,518,346 | B2 * | 4/2009 | Prexl et al. | 323/222 |
| 7,868,600 | B2 * | 1/2011 | Qiu et al. | 323/282 |
| 8,022,680 | B2 * | 9/2011 | Ryoo | 323/282 |
| 8,040,122 | B2 * | 10/2011 | Chang et al. | 323/288 |
| 8,242,764 | B2 * | 8/2012 | Shimizu et al. | 323/285 |
| 8,389,908 | B2 * | 3/2013 | Schwerman | 219/509 |
| 2005/0007089 | A1 * | 1/2005 | Niiyama et al. | 323/284 |
| 2007/0109825 | A1 * | 5/2007 | Qiu et al. | 363/41 |
| 2007/0236188 | A1 * | 10/2007 | Gibson et al. | 323/225 |
| 2008/0079406 | A1 * | 4/2008 | Holmquist et al. | 323/283 |
| 2009/0206810 | A1 * | 8/2009 | Chellamuthu et al. | 323/282 |
| 2010/0123446 | A1 * | 5/2010 | Cheng et al. | 323/288 |
| 2011/0174801 | A1 * | 7/2011 | Schwerman | 219/509 |
| 2012/0032660 | A1 * | 2/2012 | Nakamura | 323/288 |
| 2012/0086423 | A1 * | 4/2012 | Dao et al. | 323/285 |

\* cited by examiner

*Primary Examiner* — Timothy J Dole
*Assistant Examiner* — Bryan R Perez
(74) *Attorney, Agent, or Firm* — William B. Kempler; Frank D. Cimino

(57) ABSTRACT

One embodiment includes a power regulator system. The system includes a switch control stage configured to generate at least one activation signal based on a pulse-width modulation (PWM) signal and to control a respective at least one switch to generate an output voltage. The system also includes a feedback stage configured to generate the PWM signal based on a ramp signal and a feedback voltage that is based on the output voltage. The system further includes a ramp generator stage configured to adaptively generate the ramp signal based on the output voltage and based on the at least one activation signal.

14 Claims, 4 Drawing Sheets

POWER REGULATOR SYSTEM WITH ADAPTIVE RAMP SIGNAL GENERATOR

RELATED APPLICATIONS

This application claims priority from U.S. Provisional Patent Application Ser. No. 61/783,766, entitled "POWER REGULATOR SYSTEM WITH RAMP GENERATOR", filed 14 Mar. 2013, which is incorporated herein in its entirety.

TECHNICAL FIELD

This disclosure relates generally to electronic circuit systems, and specifically to a power regulator system with adaptive ramp signal generator.

BACKGROUND

Power regulator systems can be implemented in a variety of electronic devices for regulating an output voltage to provide power to one or more circuit components in the electronic device. One such type of power regulator system implements ripple-based control, such as for a buck converter, which utilizes current sensing using an equivalent-series resistor (ESR) for providing a ramp signal for implementing pulse-width modulation (PWM) to control the output current based on a control loop. However, the use of some ESR components, such as certain capacitors, can result in a delay with respect to inductor current sensing, which can result in sub-harmonic oscillations of the output current.

SUMMARY

One embodiment includes a power regulator system. The system includes a switch control stage configured to generate at least one activation signal based on a pulse-width modulation (PWM) signal and to control a respective at least one switch to generate an output voltage. The system also includes a feedback stage configured to generate the PWM signal based on a ramp signal and a feedback voltage that is based on the output voltage. The system further includes a ramp generator stage configured to adaptively generate the ramp signal based on the output voltage and based on the at least one activation signal.

Another embodiment includes a method for adaptively generating a ramp signal in a power regulator system. The method includes generating an activation signal based on a pulse-width modulation (PWM) signal and controlling a respective switch to generate an output voltage based on the PWM signal. The method also includes generating the PWM signal based on a ramp signal and a feedback voltage that is based on the output voltage. The method also includes sampling the activation signal relative to a clock signal to calculate a switching frequency and duty-cycle associated with the activation signal. The method further includes adaptively adjusting the ramp signal based on the output voltage and the switching frequency and duty-cycle of the activation signal.

Another embodiment includes a power regulator system. The system includes a switch control stage configured to generate at least one activation signal based on a pulse-width modulation (PWM) signal and to control a respective at least one switch to generate an output voltage. The system also includes a feedback stage comprising a comparator configured to generate the PWM signal based on comparing a sum of a ramp signal and a feedback voltage with an adjustable reference voltage, the feedback voltage being based on the output voltage. The system further includes a ramp generator stage comprising a resistor-capacitor (RC) circuit that is configured to generate the ramp signal, the RC circuit having an RC time constant that is adjustable based on the output voltage and based on the at least one activation signal.

DETAILED DESCRIPTION

This disclosure relates generally to electronic circuit systems, and specifically to a power regulator system with adaptive ramp signal generator. A power regulator system can include a switch control stage that is configured to generate at least one activation signal based on a pulse-width modulation (PWM) signal to control one or more switches to generate an output voltage. As an example, the switches can include a high-side switch and a low-side switch that are alternately activated based on respective activation signals to generate a current through an inductor to generate the output voltage. The power regulator system can also include a feedback system configured to generate the PWM signal based on a feedback voltage and a ramp signal. The feedback voltage can be based on the output voltage, such as proportional to the output voltage (e.g., using a voltage divider). The power regulator system can further include a ramp generator stage that is configured to generate the ramp signal based on the output voltage and the at least one activation signal (e.g., the high-side activation signal).

As an example, the ramp generator stage can include an adaptive ripple controller and at least one resistor-capacitor circuit (RC) circuit. The adaptive ripple controller is configured to sample an activation signal (e.g., the high-side activation signal) to determine a frequency and duty-cycle of the activation signal, and can generate a digital time constant signal based on the output voltage and the frequency and duty-cycle of the activation signal. The digital time constant signal can be provided to the RC circuit to set an RC time constant of the RC circuit to shape the characteristics of the ramp signal (e.g., with respect to amplitude and an increasing slew-rate). In addition, due to the presence of a potential DC component of the ramp signal, the adaptive ripple controller can also be configured to generate a digital offset signal based on the output voltage and the frequency and duty-cycle of the activation signal. The digital offset signal can be implemented to adjust a reference voltage to which a sum of the feedback voltage and the ramp voltage are compared by a comparator in the feedback stage to generate the PWM signal. Accordingly, the power regulator system can internally and adaptively generate the ramp signal.

Figure 1:
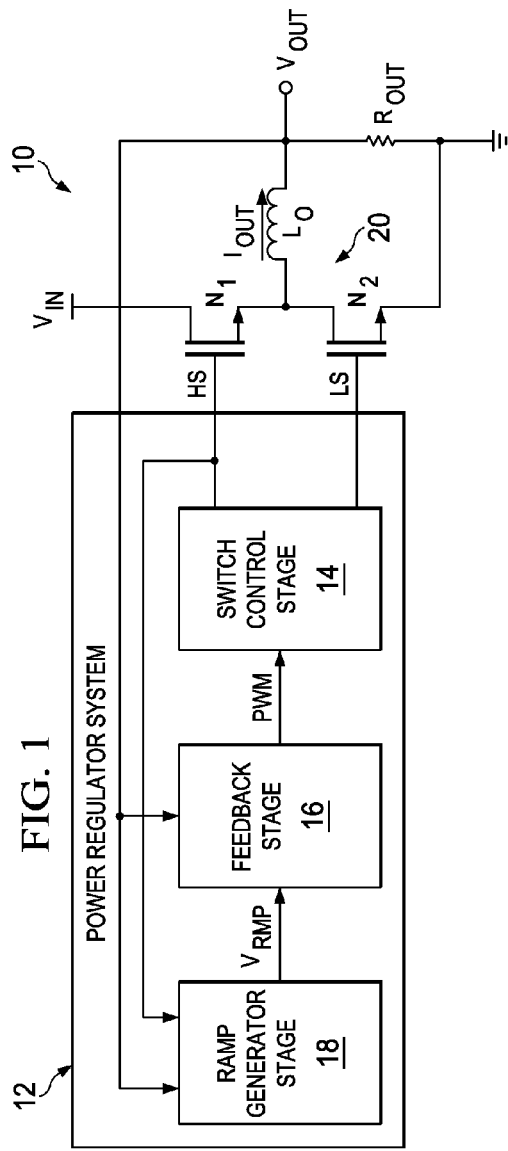
FIG. 1 illustrates an example of a power supply system.

FIG. 1 illustrates an example of a power supply system 10. The power supply system 10 can be implemented in a variety of power providing applications for electronic devices, such as portable electronic devices (e.g., wireless communication devices and/or laptop and tablet computers). The power supply system 10 is configured to generate an output voltage $V_{OUT}$ based on an input voltage $V_{IN}$, such as provided from a battery. The power supply system 10 includes a power regulator system 12. As an example, the power regulator system 12 can be implemented in an integrated circuit (IC), as a plurality of discrete components, as a standalone package or as part of an IC package.

The power regulator system 12 includes a switch control stage 14, a feedback stage 16, and a ramp generator stage 18. In the example of FIG. 1, the switch control stage 14 is configured to generate a high-side activation signal HS and a low-side activation signal LS based on a pulse-width modulation (PWM) signal PWM. The high-side activation signal HS and the low-side activation signal LS are provided to a high-side switch $N_1$ and a low-side switch $N_2$, respectively, to repeatedly activate and deactivate the high-side switch $N_1$ and the low-side switch $N_2$ in alternate sequence. In response to the activation of the high-side switch $N_1$, an input voltage $V_{IN}$ is provided to a switching node 20 to provide an output current $I_{OUT}$ through an inductor $L_O$, which thus provides an output voltage $V_{OUT}$ across a load, demonstrated in the example of FIG. 1 as a resistor $R_{OUT}$.

The feedback stage 16 is configured to generate the signal PWM based on the output voltage $V_{OUT}$ and a ramp signal $V_{RMP}$. As an example, the ramp signal $V_{RMP}$ can be an AC voltage (e.g., a sawtooth signal) that can have a variable period and including adjustable signal characteristics, such as a variable peak amplitude and a variable increasing slew-rate. The feedback stage 16 can include, for example, a voltage-divider to generate a feedback voltage proportional to the output voltage $V_{OUT}$, and can also include a comparator that is configured to generate the signal PWM based on a comparison of a sum of the feedback voltage and the ramp signal $V_{RMP}$ with respect to an adjustable reference voltage (e.g., a variable offset voltage added to a fixed reference voltage). The adjustable reference voltage can be provided, for example, based on the addition of an adjustable offset voltage with a fixed reference voltage.

The ramp generator stage 18 can be configured to generate the ramp voltage $V_{RMP}$ based on the output voltage and based on an activation signal, demonstrated in the example of FIG. 1 as the high-side activation signal HS. However, it is to be understood that the high-side activation signal HS could be a voltage signal, such that the switch control stage 14 could include a current driver to provide a separate activation signal to the ramp generator stage 18, with the separate activation signal being a current-driven signal that is asserted substantially concurrently (e.g., in phase) with the high-side activation signal HS. As an example, the ramp generator stage 18 can include an adaptive ripple controller that is configured to control characteristics of the ramp signal $V_{RMP}$, such as by controlling a resistor-capacitor (RC) time constant of an RC circuit from which the ramp signal $V_{RMP}$ is generated. In addition, the adaptive ripple controller can adjust the reference voltage that is implemented by the feedback stage 16 for generating the signal PWM, such as by adjusting an offset voltage that is summed with the reference voltage, as implemented by the associated comparator of the feedback stage 16. For example, the adaptive ripple controller can adjust the time constant and/or the offset voltage based on determining a switching frequency and duty-cycle of the high-side activation signal HS with respect to the output voltage $V_{OUT}$.

Figure 2:
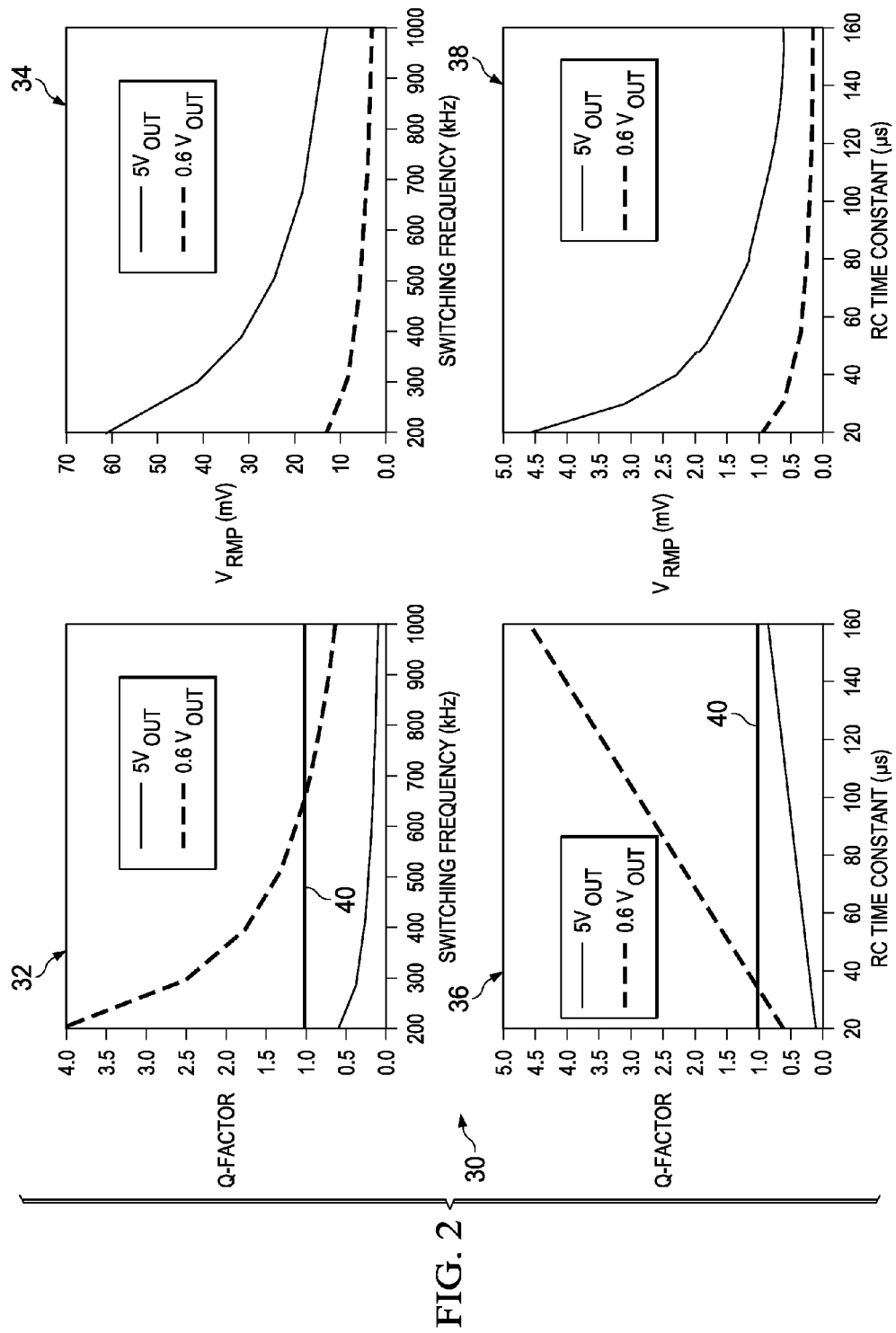
FIG. 2 illustrates an example diagram of graphs associated with a power supply system.

FIG. 2 illustrates an example diagram 30 of graphs associated with a power supply system. The power supply system associated with the graphs could correspond to the power supply system 10. The diagram 30 includes a first graph 32, a second graph 34, a third graph 36, and a fourth graph 38. The first graph 32 demonstrates a quality factor (Q-factor) of the power supply system 10 as a function of switching frequency in kilohertz (kHz) of the high-side activation signal HS, such as can affect stability of the power supply system 10. Specifically, the first graph 32 demonstrates the Q-factor with respect to a magnitude of the output voltage $V_{OUT}$ of approximately 5 volts, demonstrated by the solid line, and with respect to a magnitude of the output voltage $V_{OUT}$ of approximately 0.6 volts, demonstrated by the dashed line. The first graph 32 also demonstrates a target Q-factor value, demonstrated by the solid line 40 on the Q-factor value of "1". The second graph 34 demonstrates the ramp signal $V_{RMP}$ in millivolts (mV, peak-to-peak) plotted versus the switching frequency for the output voltage $V_{OUT}$ of a magnitude of approximately 5 volts, demonstrated by the solid line, and for an output voltage $V_{OUT}$ of a magnitude of approximately 0.6 volts, demonstrated by the dashed line.

The third graph 36 demonstrates a Q-factor of the power supply system 10 as a function of an RC time constant of the RC circuit in the ramp generator stage 18 in microseconds (μs). Specifically, the third graph 36 demonstrates the Q-factor with respect to a magnitude of the output voltage $V_{OUT}$ of approximately 5 volts, demonstrated by the solid line, and with respect to a magnitude of the output voltage $V_{OUT}$ of approximately 0.6 volts, demonstrated by the dashed line. The third graph 36 also demonstrates the target Q-factor value, demonstrated by the solid line 40 on the Q-factor value of "1". The fourth graph 45 demonstrates the ramp signal $V_{RMP}$ in mV (peak-to-peak) plotted versus the RC time constant of the RC circuit in the ramp generator stage 18 in μs for the output voltage $V_{OUT}$ of a magnitude of approximately 5 volts, demonstrated by the solid line, and for an output voltage $V_{OUT}$ of a magnitude of approximately 0.6 volts, demonstrated by the dashed line.

The graphs 32, 34, 36, and 38 thus demonstrate the effects of the adjustments to the switching frequency and the RC time constant of the RC circuit as a function of the output voltage $V_{OUT}$ with respect to the ramp signal $V_{RMP}$ and the stability of the power supply system 10. For example, larger values of the switching frequency of the high-side activation signal HS result in a smaller ramp with respect to the ramp signal $V_{RMP}$, and decrease the Q-factor of the power supply system 10. Conversely, larger values of the RC time constant result in a smaller ramp with respect to the ramp signal $V_{RMP}$, but increase the Q-factor of the power supply system 10. Thus, the ramp generator stage 18 can adaptively generate the ramp signal $V_{RMP}$ to balance stability of the power supply system 10 with respect to the characteristics of the ramp signal $V_{RMP}$ (e.g., as a function of the peak-to-peak magnitude), as a function of the output voltage $V_{OUT}$.

As a result, the power regulator system 12 can generate the ramp signal $V_{RMP}$ as an adaptive and internal ramp signal for generating the signal PWM, and thus for controlling the high-side switch $N_1$ and the low-side switch $N_2$ for generating the output voltage $V_{OUT}$. Because the ramp signal $V_{RMP}$ is generated internally (e.g., in an IC package that houses the power regulator system 12), the power supply system 10 can provide the output voltage $V_{OUT}$ without additional external ramp generating circuitry, which can be more expensive, occupy more area on a circuit board, and can be susceptible to noise. Additionally, because the power regulator system 12 generates the ramp signal $V_{RMP}$ based on the output voltage $V_{OUT}$ and data associated with the high-side activation signal HS (e.g., switching frequency and duty-cycle), the ramp signal $V_{RMP}$ can be automatically and adaptively adjusted in response to changes in the output voltage $V_{OUT}$ or the characteristics associated with the high-side activation signal HS, such as to substantially mitigate the possibility of sub-harmonic oscillations of the output voltage $V_{OUT}$. Furthermore, because the ramp generator stage 18 can adaptively adjust the reference voltage that is implemented to generate the signal PWM, such as to offset a DC component associated with the ramp signal $V_{RMP}$, an additional voltage loop is not required to be implemented by the power supply system 10 to cancel the DC component of the ramp signal $V_{RMP}$ for accurately generating the output voltage $V_{OUT}$.

Figure 3:
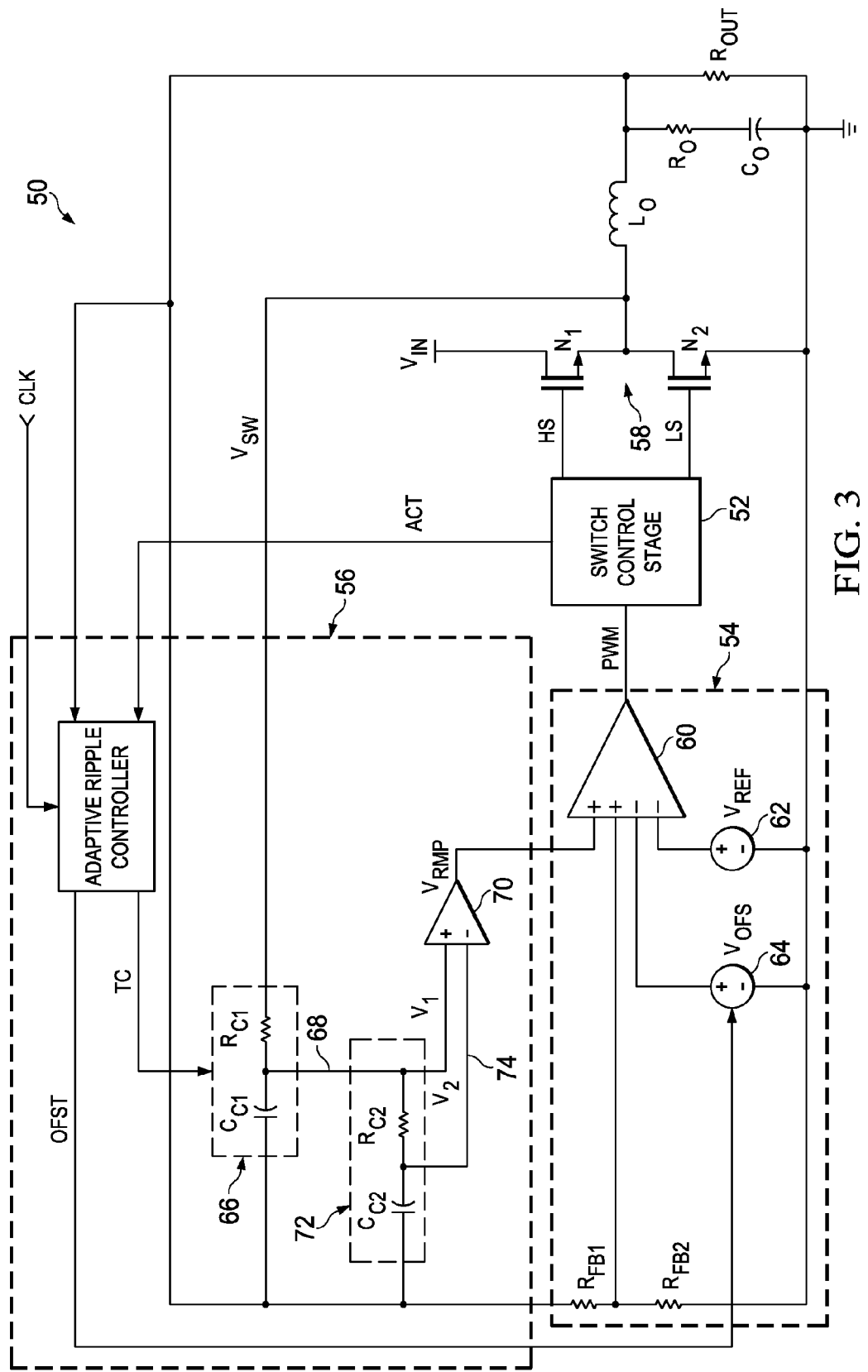
FIG. 3 illustrates an example of a power supply circuit.

FIG. 3 illustrates an example of a power supply circuit 50. The power supply circuit 50 can be implemented in a variety of power providing applications for electronic devices. The power supply system 50 includes a switch control stage 52, a feedback stage 54, and a ramp generator stage 56, that can correspond respectively to the switch control stage 14, the feedback stage 16, and the ramp generator stage 18 in the example of FIG. 1. Thus, the switch control stage 52, the feedback stage 54, and the ramp generator stage 56 can collectively correspond to a power regulator system, such as the power regulator system 10. Therefore, the switch control stage 52, the feedback stage 54, and the ramp generator stage 56 can be provided in an IC package (e.g., collectively or individually in one or more chips).

The switch control stage 52 is configured to generate the high-side activation signal HS and the low-side activation signal LS based on the signal PWM. Similar to as described previously regarding the example of FIG. 1, the high-side activation signal HS and the low-side activation signal LS are provided to a high-side switch $N_1$ and a low-side switch $N_2$, respectively, to repeatedly activate and deactivate the high-side switch $N_1$ and the low-side switch $N_2$ in alternate sequence. In response to the activation of the high-side switch $N_1$, an input voltage $V_{IN}$ is provided to a switching node 58 having a switching voltage $V_{SW}$ to provide the output current $I_{OUT}$ through the inductor $L_O$, which thus provides the output voltage $V_{OUT}$ across the load $R_{OUT}$, as well as an output filter that includes a resistor $R_O$ and a capacitor $C_O$. In addition, the switch control stage 52 can be configured to generate an activation signal ACT that can be a current signal that is asserted substantially concurrently with the high-side activation signal HS. For example, the switch control stage 52 can be configured as a control logic and driver circuit, such that the high-side activation signal HS can be generated as a voltage signal that is based on the corresponding activation signal ACT that is generated as a current signal.

The feedback stage 54 includes a comparator 60 that is configured to generate the signal PWM. In the example of FIG. 3, the comparator 60 is configured to compare a sum of a feedback voltage $V_{FB}$ and a ramp signal $V_{RMP}$, demonstrated as being provided to non-inverting inputs of the comparator 60, with a sum of a reference voltage $V_{REF}$ and an offset voltage $V_{OFF}$, demonstrated as being provided to inverting inputs of the comparator 60. As an example, the ramp signal $V_{RMP}$ can be an AC sawtooth voltage having a variable period, a variable peak amplitude, and a variable slew-rate of increase. The feedback voltage $V_{FB}$ is demonstrated in the example of FIG. 3 as being generated via a voltage-divider formed from a first feedback resistor $R_{FB1}$ and a second feedback resistor $R_{FB2}$ that provides the feedback voltage $V_{FB}$ based on the output voltage $V_{OUT}$. The reference voltage $V_{REF}$ is demonstrated in the example of FIG. 3 as a substantially constant voltage that is generated by a voltage source 62, and the offset voltage $V_{OFF}$ is demonstrated as a variable voltage that is generated by an adjustable voltage source 64 based on a digital offset signal OFST. The comparator 62 can thus generate the PWM signal based on the comparison of the ramp signal $V_{RMP}$, as summed with the feedback voltage $V_{FB}$, with the reference voltage $V_{REF}$, as summed with the offset voltage $V_{OFF}$, to provide the signal PWM as having a pulse-width that corresponds to the portions of the period of the ramp signal $V_{RMP}$ at which the sum of the ramp signal $V_{RMP}$ and the feedback voltage $V_{FB}$ exceed the sum of the reference voltage $V_{REF}$ and the offset voltage $V_{OFF}$.

The ramp generator stage 56 includes an adaptive ripple controller 64. The adaptive ripple controller 64 is configured to generate a digital time constant signal TC and the digital offset signal OFST based on the output voltage $V_{OUT}$, the activation signal ACT, and a clock signal CLK. As an example, the adaptive ripple controller 64 can be configured to sample the activation signal ACT with respect to the clock signal CLK to ascertain a switching frequency and a duty-cycle of the activation signal ACT, and thus of the high-side activation signal HS. The adaptive ripple controller 64 could thus utilize the values of the frequency and duty-cycle of the high-side activation signal HS as a function of the output voltage $V_{OUT}$ to generate the digital time constant signal TC and the activation signal ACT. The digital time constant signal TC and the digital offset signal OFST can thus be implemented to adaptively tune the signal characteristics of the ramp voltage $V_{RMP}$, as described herein.

In the example of FIG. 3, the digital time constant signal TC is provided to a first RC circuit 66 that is formed by a resistor $R_{C1}$ and a capacitor $C_{C1}$. The capacitor $C_{C1}$ interconnects the output voltage $V_{OUT}$ and a first intermediate node 68 that is provided to a first input of a voltage amplifier 70. The resistor $R_{C1}$ interconnects the first intermediate node 68 and the switching voltage $V_{SW}$. The RC time constant of the first RC circuit 66 can be adjusted based on the digital time constant signal TC adjusting at least one of a variable resistance of the resistor $R_{C1}$ and a variable capacitance of the capacitor $C_{C1}$. In addition, the ramp generator stage 56 includes a second RC circuit 72 that is formed by a resistor $R_{C2}$ and a capacitor $C_{C2}$. The resistor $R_{C2}$ and capacitor $C_{C2}$ can be fixed components in contrast to the variable RC circuit 66. The capacitor $C_{C2}$ interconnects the output voltage $V_{OUT}$ and a second intermediate node 74 that is provided to a second input of the voltage amplifier 70. The resistor $R_{C2}$ interconnects the first intermediate node 68 and the second intermediate node 74. Therefore, a voltage $V_1$ at the first intermediate node 68 and a voltage $V_2$ at the second intermediate node 74 are each provided as oscillating voltages. The voltage amplifier 70 is thus configured to generate the ramp signal $V_{RMP}$ based on a difference between the voltages $V_1$ and $V_2$, with such difference being based on the resistance of the $R_{C2}$ and the RC time constant of the first RC circuit 66, which further varies based on the respective capacitances of $C_{C1}$ and $C_{C2}$. Because the RC time constant of RC circuit 66 is set based on the digital time constant signal TC, which is generated by the adaptive ripple controller 64 based on the switching frequency and duty-cycle of the high-side activation signal HS and the output voltage $V_{OUT}$, the ramp signal $V_{RMP}$ can thus be adaptively generated with respect to signal characteristics (e.g., peak amplitude and slew-rate), likewise based on the switching frequency and duty-cycle of the activation signal ACT and the output voltage $V_{OUT}$.

The digital offset signal OFST is provided from the adaptive ripple controller 64 to the variable voltage source 62 to adjust the magnitude of the offset voltage $V_{OFF}$. For example, the ramp signal $V_{RMP}$ can include a DC component on which the AC voltage components are modulated. Therefore, the offset voltage $V_{OFF}$ can be provided to substantially cancel the DC component of the ramp signal $V_{RMP}$, such that the comparison of the sum of the ramp voltage $V_{RMP}$ and the feedback voltage $V_{FB}$ can be compared with the sum of the reference voltage $V_{REF}$ and the offset voltage $V_{OFF}$ to generate the signal PWM to provide stability in the generation of the output voltage $V_{OUT}$. Because the adaptive ripple controller 64 generates the digital time constant signal TC adaptively based on the switching frequency and duty-cycle of the high-side activation signal HS and the output voltage $V_{OUT}$, the adaptive ripple controller 64 can thus ascertain the magnitude of the DC component of the ramp signal $V_{RMP}$ that is to be substantially canceled by the offset voltage $V_{OFF}$, and thus can adaptively adjust the offset voltage $V_{OFF}$ accordingly. As a result, the signal PWM can be generated adaptively based on the variable signal characteristics of the ramp signal $V_{RMP}$ and the substantial cancellation of the DC offset of the ramp signal $V_{RMP}$ based on the offset voltage $V_{OFF}$.

Figure 4:
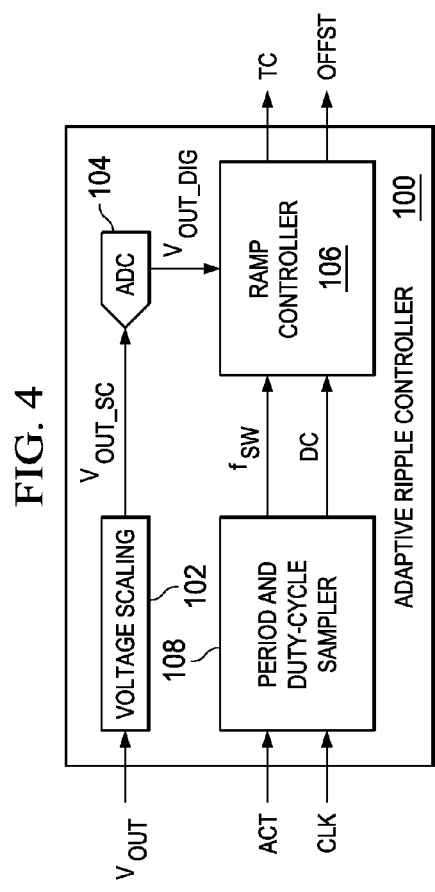
FIG. 4 illustrates an example of an adaptive ripple controller.

FIG. 4 illustrates an example of an adaptive ripple controller 100. The adaptive ripple controller 100 can correspond to the adaptive ripple controller 64 in the example of FIG. 3. Therefore, reference is to be made to the example of FIG. 3 in the following description of the example of FIG. 4. The adaptive ripple controller 100 can include analog circuitry, digital circuitry or a combination analog and digital circuitry.

The adaptive ripple controller 100 includes a voltage scaling component 102 that is configured to provide programmable scaling of the output voltage $V_{OUT}$ resulting in a scaled output voltage $V_{OUT\_SC}$. An analog-to-digital converter (ADC) 104 is configured to convert the scaled output voltage $V_{OUT\_SC}$ from an analog representation to a digital representation. The ADC 104 can be configured as any of a variety of different types of ADCs to provide the output voltage $V_{OUT}$ as a digital signal $V_{OUT\_DIG}$ having a given resolution. The digital output voltage $V_{OUT\_DIG}$ is provided to a ramp controller 106. In addition, the adaptive ripple controller 100 also includes a sampler 108 that is configured to sample the activation signal ACT (e.g., corresponding to the high-side activation signal HS) based on the clock signal CLK. As an example, the clock signal CLK can be generated by any of a variety of stable frequency reference sources, such as can be provided from an external clock to a pin of the IC package in which the power supply circuit 50 is included, or the clock can be included in the IC package itself. The sampler 108 can thus ascertain a switching frequency $f_{SW}$ of the activation signal ACT, as well as a duty-cycle DC of the activation signal ACT, as a function of the frequency of the clock signal CLK. The switching frequency $f_{SW}$ and the duty-cycle DC can likewise be provided to ramp controller 106.

The ramp controller 106 can include an arrangement of digital logic, such as to implement digital processing of the switching frequency $f_{SW}$ and the duty-cycle DC with respect to the digital output voltage $V_{OUT\_DIG}$. The ramp controller 106 can thus generate the digital time constant signal TC and the digital offset signal OFST based on the relative magnitudes of the switching frequency $f_{SW}$, the duty-cycle DC, and the digital output voltage $V_{OUT\_DIG}$. For example, the ramp controller 106 can rapidly and accurately respond to load transients, such as indicated by the magnitude of the digital output voltage $V_{OUT\_DIG}$, by adaptively adjusting the RC time constant of the first RC circuit 66 based on the digital time constant signal TC, as well as adjusting the corresponding offset voltage $V_{OFF}$ based on the digital offset signal OFST. As a result, the signal PWM can be rapidly adjusted accordingly to provide for continued stability of the generated output voltage $V_{OUT}$ based on the switching of the high-side switch $N_1$ and the low-side switch $N_2$. Furthermore, the internal generation of the ramp signal $V_{RMP}$ by the ramp generator stage 56, as well as the adaptive adjustment of the signal characteristics of the ramp signal $V_{RMP}$ by the adaptive ripple controller 100, allows for a more compact power supply circuit 50 that implements ripple-control without external ramp generation and voltage loop circuitry.

Figure 5:
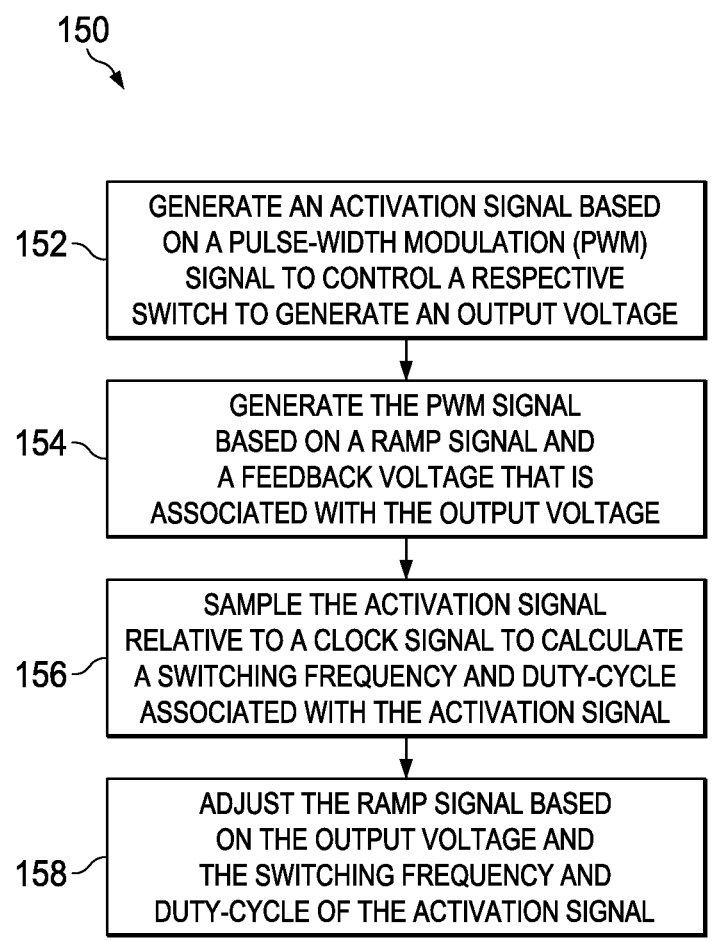
FIG. 5 illustrates an example of a method for adaptively generating a ramp signal in a power regulator system.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. The method can be implemented by analog circuitry, digital circuitry or a combination of analog and digital circuitry, such as can be implemented in a single IC chip as disclosed herein.

FIG. 5 illustrates an example of a method 150 for adaptively generating a ramp signal in a power regulator system. At 152, an activation signal (e.g., the activation signal ACT) is generated based on a pulse-width modulation (PWM) signal (e.g., the signal PWM) to control a respective switch (e.g., the high-side switch $N_1$) to generate an output voltage (e.g., the output voltage $V_{OUT}$). At 154, the PWM signal is generated based on a ramp signal (e.g., the ramp signal $V_{RMP}$) and a feedback voltage (e.g., the feedback voltage $V_{FB}$) that is associated with the output voltage. At 156, the activation signal is sampled relative to a clock signal (e.g., the clock signal CLK) to calculate a switching frequency (e.g., the switching frequency $f_{SW}$) and duty-cycle (e.g., the duty-cycle DC) associated with the activation signal. At 158, the ramp signal is adaptively adjusted based on the output voltage and the switching frequency and duty-cycle of the activation signal. The adaptive adjustment to the ramp signal can be substantially continuous based on changes to the output voltage and/or the switching frequency and duty-cycle.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power regulator system comprising:
    a switch control stage configured to generate at least one activation signal based on a pulse-width modulation (PWM) signal and to control a respective at least one switch to generate an output voltage;
    a feedback stage configured to generate the PWM signal based on a ramp signal and a feedback voltage that is based on the output voltage; and
    a ramp generator stage configured to adaptively generate the ramp signal based on the output voltage and based on the at least one activation signal, wherein the ramp generator stage comprises an adaptive ripple controller configured to set a resistor-capacitor (RC) time constant of at least one RC circuit and to adjust a magnitude of a reference voltage based on the output voltage and based on the at least one activation signal, wherein the ramp signal is generated based on the at least one RC circuit, and wherein the ramp signal is compared with the reference voltage to generate the PWM signal and wherein the at least one RC circuit comprises a first RC circuit connecting the output voltage and the switching voltage and a second RC circuit connecting the output voltage and an intermediate node associated with the first RC circuit, each of the first and second RC circuits being connected to respective inputs of a voltage amplifier to generate the ramp signal.

2. The system of claim 1, wherein the ramp generator stage comprises at least one resistor-capacitor (RC) circuit that is repeatedly charged and discharged based on a difference between the output voltage and a switching voltage at a switching node that is associated with the at least one switch at each of a respective deactivation and activation of the at least one switch to generate the ramp signal.

3. The system of claim 1, wherein the first RC circuit has an associated variable RC time constant, wherein the ramp generator stage further comprises an adaptive ripple controller configured to set the variable RC time constant based on the output voltage and based on the at least one activation signal.

4. The system of claim 3, wherein the adaptive ripple controller comprises:
   a period and duty-cycle sampler configured to ascertain a switching frequency and a duty-cycle associated with the at least one activation signal based on a clock signal; and
   a ramp controller configured to generate a digital time constant signal based on the output voltage, the switching frequency, and the duty-cycle, the digital time constant signal being provided to set the variable RC time constant of the at least one RC circuit.

5. The system of claim 1, wherein the feedback stage comprises a comparator configured to generate the PWM signal based on comparing a sum of the feedback voltage and the ramp signal with a sum of a reference voltage and an adjustable offset voltage.

6. The system of claim 5, wherein the feedback stage further comprises a variable DC voltage source configured to generate the adjustable offset voltage, and wherein the ramp generator stage further comprises an adaptive ripple controller configured to set the adjustable offset voltage based on the output voltage and based on the at least one activation signal to substantially mitigate a DC magnitude associated with the ramp signal.

7. The system of claim 6, wherein the adaptive ripple controller comprises:
   a period and duty-cycle sampler configured to ascertain a switching frequency and a duty-cycle associated with the at least one activation signal based on a clock signal; and
   a ramp controller configured to generate a digital offset signal based on the output voltage, the switching frequency, and the duty-cycle, the digital offset signal being provided to set the the adjustable offset voltage of the variable DC voltage source.

8. An integrated circuit (IC) comprising the power regulator system of claim 1.

9. A method for adaptively generating a ramp signal in a power regulator system, the method comprising:
   generating an activation signal based on a pulse-width modulation (PWM) signal;
   controlling a respective switch based on the PWM signal to generate an output voltage;
   generating the PWM signal based on a ramp signal and a feedback voltage that is based on the output voltage;
   sampling the activation signal relative to a clock signal to calculate a switching frequency and duty-cycle associated with the activation signal; and
   adaptively adjusting the ramp signal based on the output voltage and the switching frequency and duty-cycle of the activation signal, wherein generating the ramp signal comprises:
   generating a time constant digital signal based on the output voltage and the switching frequency and duty-cycle of the activation signal; and
   providing the time constant digital signal to adjust an RC time constant of the RC circuit, the RC circuit being repeatedly charged and discharged based on a difference between the output voltage and a switching voltage at a switching node that is associated with the switch at each of a respective deactivation and activation of the switch, wherein the RC circuit is a first RC circuit, wherein generating the ramp signal further comprises amplifying a difference between a first oscillating voltage provided by the first RC circuit and a second oscillating voltage provided by a second RC circuit that is repeatedly charged and discharged at each of a respective deactivation and activation of the switch.

10. The method of claim 9, wherein sampling the activation signal comprises calculating an amplitude and an increasing slew-rate associated with the ramp signal based on the output voltage and the switching frequency and duty-cycle of the activation signal, wherein generating the ramp signal comprises generating the ramp signal based on the calculated amplitude and increasing slew-rate.

11. The method of claim 9, wherein generating the PWM signal comprises comparing a sum of the feedback voltage and the ramp signal with a sum of a reference voltage and a variable offset voltage that is based on a DC component of the ramp signal.

12. The method of claim 11, further comprising:
   generating an offset digital signal based on the output voltage and based on the switching frequency and duty-cycle of the activation signal; and
   providing the offset digital signal to set the variable offset voltage.

13. A power regulator system comprising:
   a switch control stage configured to generate at least one activation signal based on a pulse-width modulation (PWM) signal and to control a respective at least one switch to generate an output voltage based on a switching voltage at a switching node to which the at least one switch is coupled;
   a feedback stage comprising a comparator configured to generate the PWM signal based on comparing a sum of a ramp signal and a feedback voltage with an adjustable reference voltage, the feedback voltage being based on the output voltage; and
   a ramp generator stage comprising a resistor-capacitor (RC) circuit that is configured to adaptively generate the ramp signal based on the output voltage and the switching voltage, the RC circuit having an RC time constant that is adjustable based on the output voltage and based on the at least one activation signal, wherein the ramp generator stage comprises an adaptive ripple controller, the adaptive ripple controller comprising:
   a period and duty-cycle sampler configured to ascertain a switching frequency and a duty-cycle associated with the at least one activation signal based on a clock signal; and
   a ramp controller configured to generate a digital time constant signal based on the output voltage, the switching frequency, and the duty-cycle, the digital time constant signal being provided to the RC circuit to adjust the RC time constant, wherein the RC circuit is a first RC circuit connecting the output voltage and the switching voltage, wherein the ramp generator stage further comprises a second RC circuit connecting the output voltage and an intermediate node associated with the first RC circuit, each of the first and second RC circuits being connected to respective inputs of a voltage amplifier to generate the ramp signal.

14. The system of claim 13, wherein the ramp generator stage is configured to generate a digital offset signal based on a DC component of the ramp signal, and wherein the feedback stage comprises:
- a comparator configured to compare the sum of a ramp signal and the feedback voltage with the adjustable reference voltage; and
- a variable DC voltage source configured to generate an offset voltage having a magnitude that is based on a DC component of the ramp signal, the offset voltage being added to the a constant reference voltage to generate the adjustable reference voltage.

\* \* \* \* \*